United States Patent
Gloutsos et al.

(10) Patent No.: US 7,152,491 B2
(45) Date of Patent: Dec. 26, 2006

(54) MAGNETOSTRICTIVE VEHICLE WEIGHT SENSOR

(75) Inventors: Tony Gloutsos, Novi, MI (US); Edward W. Clancy, Novi, MI (US); Robert Janiszewski, Ann Arbor, MI (US); Jason Doering, Flushing, MI (US); Hossam Almasri, Sterling Heights, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 61 days.

(21) Appl. No.: 11/111,437

(22) Filed: Apr. 22, 2005

(65) Prior Publication Data

US 2006/0236785 A1 Oct. 26, 2006

(51) Int. Cl.
*G01L 5/00* (2006.01)
*G01L 3/00* (2006.01)

(52) U.S. Cl. .................... 73/862.391; 73/862.331; 73/862.333; 73/862.335; 73/862.325; 73/862.69; 73/DIG. 2

(58) Field of Classification Search .......... 73/862.331, 73/862.333, 862.335, 862.325, 862.391, 73/862.69, DIG. 2
See application file for complete search history.

(56) References Cited

U.S. PATENT DOCUMENTS

| 5,739,757 | A | 4/1998 | Gioutsos |
| 6,254,126 | B1 | 7/2001 | Bauer et al. |
| 6,622,577 | B1 * | 9/2003 | Uras ................. 73/862.69 |
| 7,062,981 | B1 * | 6/2006 | Spohr ................ 73/862.333 |
| 2004/0061617 | A1 * | 4/2004 | Gioutsos et al. ........ 340/667 |

FOREIGN PATENT DOCUMENTS

WO        WO 73756 A1 * 12/2000

* cited by examiner

Primary Examiner—Edward Lefkowitz
Assistant Examiner—Freddie Kirkland, III
(74) Attorney, Agent, or Firm—Lonnie Drayer

(57) ABSTRACT

A vehicle seat weight sensing system includes a plurality of sensors mounted below a seating surface of a vehicle seat. Each sensor includes a tubular inner wall about which are coiled an activation coil and a detection coil. All of the weight of the seating surface is borne by the inner walls of the sensors. The activation coil induces a current in the tubular inner wall which is detected by the detection coil. Stress in the inner wall alters the signal detected by the detection coil. Analysis of the wave form of the signal indicates the amount of stress applied to the tubular inner wall and the weight upon the vehicle seating surface. A fastener connecting to vehicle seat components passes through the tubular inner wall and retains the sensors in the vehicle seat.

12 Claims, 3 Drawing Sheets

MAGNETOSTRICTIVE VEHICLE WEIGHT SENSOR

BACKGROUND OF THE INVENTION

The present invention relates generally to weight sensors and more particularly to a magnetostrictive weight sensor for a vehicle seat.

Current vehicles include active restraints, such as airbags. It is desirable to determine whether an occupant is present in a vehicle seat and to determine the weight of the occupant in the vehicle seat. The active restraint may be disabled if the seat is not occupied, or is the occupant is a child. It may also be desirable to vary the strength with which the active restraint is deployed based upon the weight of the occupant.

U.S. Pat. No. 5,739,757, the Assignee of which is the Assignee of this invention, describes a weight sensor using a magnetostrictive sensor. The magnetostrictive sensor is positioned adjacent a ferromagnetic element, such as a wire in the seat. The magnetostrictive sensor includes a ferrite core having an excitation coil which when driven by a function generator forms an electromagnet. The sensor further includes a detection coil also coiled about the ferrite core. An electromotive force voltage is induced in the detection coil by the electromagnet. When a weight, such as a passenger, is placed upon the seating surface, the weight is transmitted to the ferromagnetic element, thereby inducing strain in the ferromagnetic element. The strain in the ferromagnetic element alters the magnetic field in the electromotive force voltage generated by the detection coil. By analyzing the signal generated by the detection coil, the weight upon the seating surface can be determined.

SUMMARY OF THE INVENTION

The present invention provides a vehicle seat weight sensor which is easier to incorporate in a vehicle seat and which provides improved measurement of the occupant weight. The vehicle seat weight sensor is mounted below the seating surface of a vehicle seat. The sensor includes a wall defining a passageway for receiving a fastener. A coil adjacent the wall measures stress in the wall to determine a weight on the seating surface.

In one embodiment, the inner wall is a tubular inner wall of a bobbin. An activation coil and a detection coil are each coiled about the tubular inner wall. A fastener for fastening two vertically spaced vehicle seat components passes through the interior of the tubular inner wall. Weight on the seating surface produces stress on the tubular inner wall and the stress is measured by the detection coil to determine the weight on the seating surface.

This arrangement provides an easier installation in a vehicle seat and an improved measurement of the weight on the seating surface. This arrangement also provides the added benefit in that the fastener provides a preload to the tubular inner wall, which places the magnetostrictive sensor in its linear operating range for improved accuracy.

BRIEF DESCRIPTION OF THE DRAWINGS

Other advantages of the present invention can be understood by reference to the following detailed description when considered in connection with the accompanying drawings wherein.

DETAILED DESCRIPTION OF A PREFERRED EMBODIMENT

Figure 1:
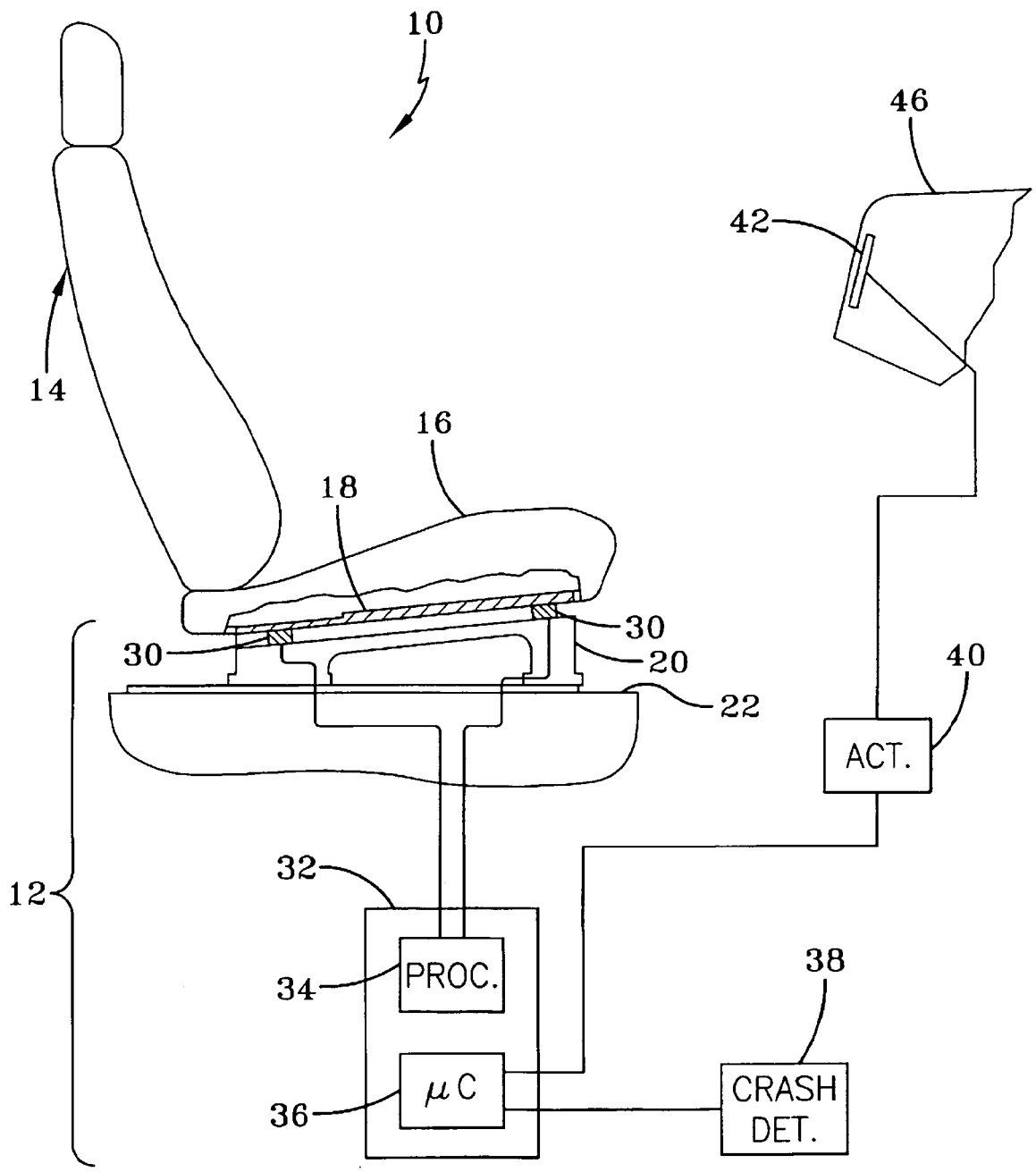
FIG. 1 is a schematic of the vehicle seat weight sensing system installed in a vehicle.

A vehicle seat assembly 10 according to the present invention is shown schematically in FIG. 1. A vehicle seat weight sensor system 12 is mounted beneath a vehicle seat 14. The seat 14 includes a seat base 16 having a seat pan 18 mounted on a seat frame 20. The seat frame 20 is attached to the vehicle floor 22. A plurality of magnetostrictive sensors 30 are disposed between components in the seat 14. In the example shown, the sensors 30 are mounted between the seat pan 18 and the seat frame 20. Alternatively, the sensors 30 could be mounted between the seat frame 20 and the vehicle floor 22. Although only two sensors 30 are visible in FIG. 1, it should be understood that four sensors 30 are utilized, each in a corner of the seat pan 18. The four sensors 30 together bear all of the weight of the seat 14 and any weight on the seating surface of the seat base 16.

All of the sensors 30 are connected to a controller 32 having processing circuitry 34 and a microprocessor 36. The processing circuitry 34 sends an activation signal to each of the sensors 30 and receives a detection signal from each of the sensors 30. The processing circuitry 34 may include a signal generator, band pass filter and amplifier for producing the activation signal. The processing circuitry 34 may include a band pass filter, amplifier and rectifier for processing the detected signal. The band pass filter applied to the detected signal may pass the third harmonic of the frequency of the activation signal. The detected signal is analyzed by the microprocessor 36, such as by measuring the amplitude of the third harmonic of the detected signal, to determine the weight applied to each of the sensors 30 and the total weight applied to the seating surface of the seat base 16. Based upon the information from each of the sensors 30, the microprocessor 36 may determine whether the seat 14 is empty, whether the seat 14 is occupied by an adult, whether the seat 14 is occupied by a child or a child in a child seat, and the weight of an occupant in the seat 14.

The controller 32 further receives a crash detection signal from a crash detector 38, which may include a ball-in-tube crash detector and/or accelerometers and other processing. The crash detector 38 determines the occurrence of a crash and the severity of the crash and communicates this information to the controller 32.

Based upon the presence and weight of the occupant and the occurrence and severity of the crash, the microprocessor 36 may cause an actuator 40 to activate an active restraint, such as an airbag 42 mounted in a dashboard 46. Of course, other active restraints are known and this invention would be applicable to many active restraints. Although the vehicle seat weight sensor system 12 is shown installed on a front seat passenger side of a vehicle, it could also be used on the driver's side or in rear seats.

Figure 2:
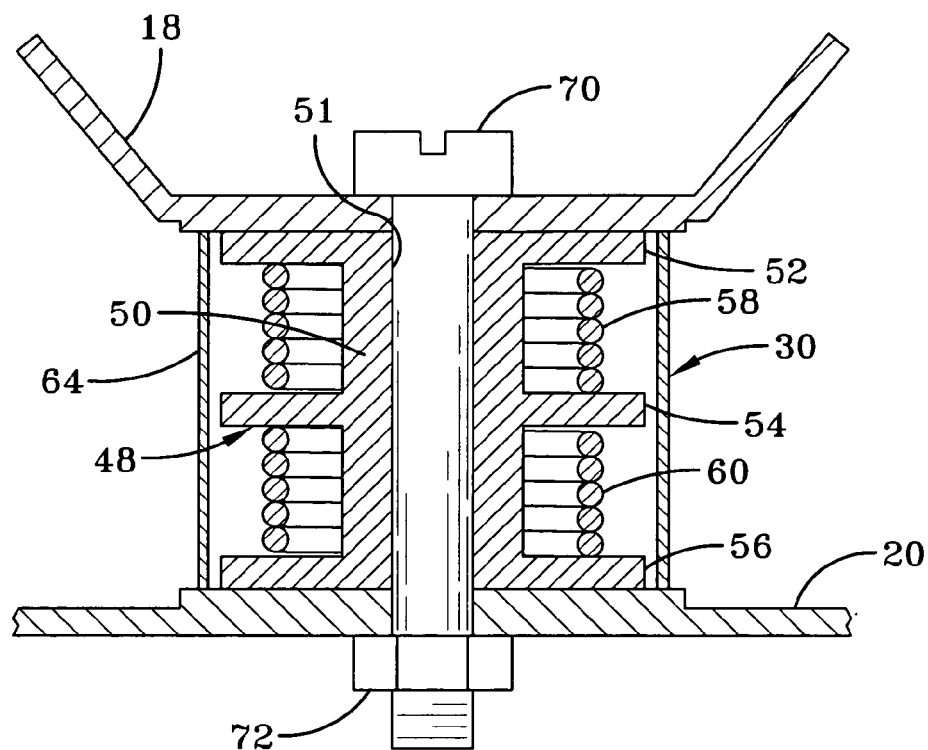
FIG. 2 is a sectional view of one of the sensors of FIG. 1.

FIG. 2 is a sectional view of one of the sensors 30 mounted between the seat pan 18 and the seat frame 20. All of the sensors 30 are identical. The sensor 30 includes a bobbin 48 which may be formed of nickel. The bobbin 48 includes a tubular inner wall 50 defining an aperture or passageway 51 therethrough. The bobbin 48 further includes the plurality of spaced annular plates, including an upper plate 52, a divider plate 54 and a lower plate 56, each extending radially outwardly from the tubular inner wall 50. The bobbin 48 is preferably cast, molded or machined as a single piece of nickel.

An activation coil 58 is coiled about the tubular inner wall 50 between the upper plate 52 and the divider plate 54. A detection coil 60 is coiled about the tubular inner wall 50 between the divider plate 54 and the lower plate 56. The activation signal from the processing circuitry 34 (FIG. 1) is applied to the activation coil 58, while the detection signal received by the processing circuitry 34 (FIG. 1) is generated by the detection coil 60.

The bobbin 48 and coils 58, 60 are encased by a casing 64, which may be formed of steel/pvc. The sensor 30 is retained in place between the seat pan 18 and the seat frame 20 by a fastener 70 extending through an aperture in the seat pan 18, through the passageway 51 through the sensor 30 and through an aperture in the seat frame 20. The fastener 70 is secured by a nut 72 on a threaded lower end of the fastener 70. The fastener 70 preferably does not include threads adjacent the seat pan 18, tubular inner wall 50 or seat frame 20, as this can interfere with the measured weight. The entire weight on the seat pan 18 is borne by the tubular inner walls 50 of all four sensors 30.

Referring to FIG. 2, the sensors 30 can readily be incorporated in an existing vehicle seat design. Where two vehicle seat components, for example the seat pan 18 and seat frame 20, were previously connected, the sensor 30 can be interposed. A longer fastener 70, as shown, can be used to connect the sensor 30 between the previously connected components (seat pan 18 and seat frame 20). In this manner, installation of the sensors 30 into a previously existing vehicle seat design is facilitated. As an additional benefit, the fastener 70 imparts a preload on the tubular inner wall 50 which places the sensor 30 into a operating range where the relationship between stress and the alteration of the signal detected by the detection coil 60 is linear.

Figure 3:
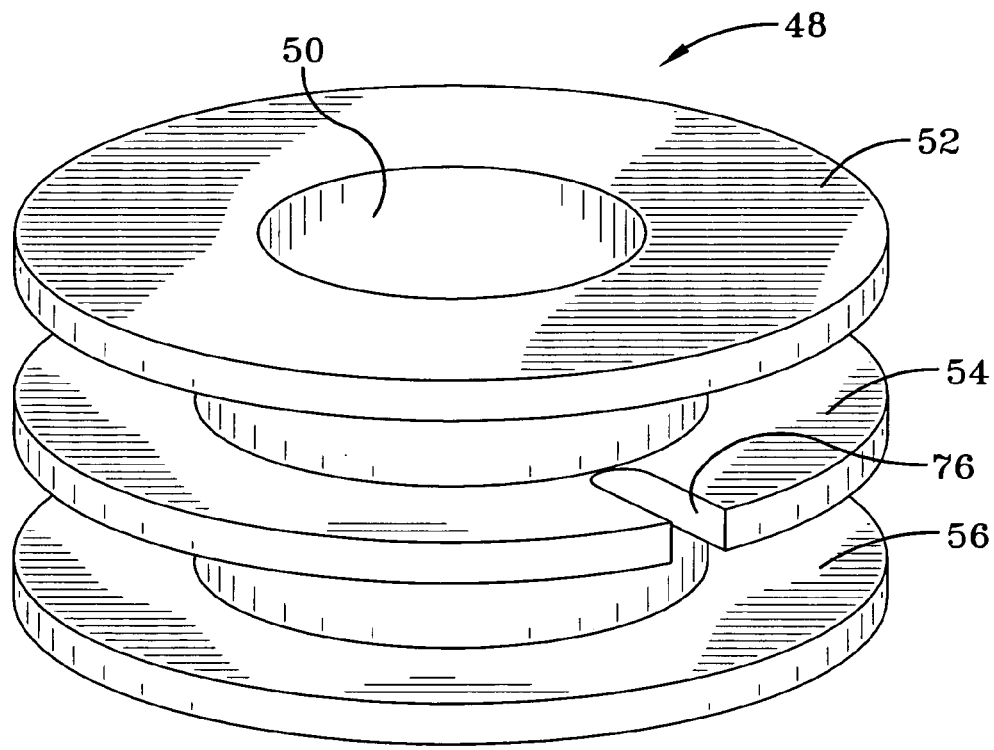
FIG. 3 is a perspective view of the bobbin of the sensor of FIG. 2.

FIG. 3 is a perspective view of the bobbin 48 of FIG. 2, showing the upper plate 52, divider plate 54 and lower plate 56 extending radially outwardly from the tubular inner wall 50. As shown, the divider plate 54 may include a slot 76 for routing wires from the coils 58,60 (FIG. 2).

Figure 4:
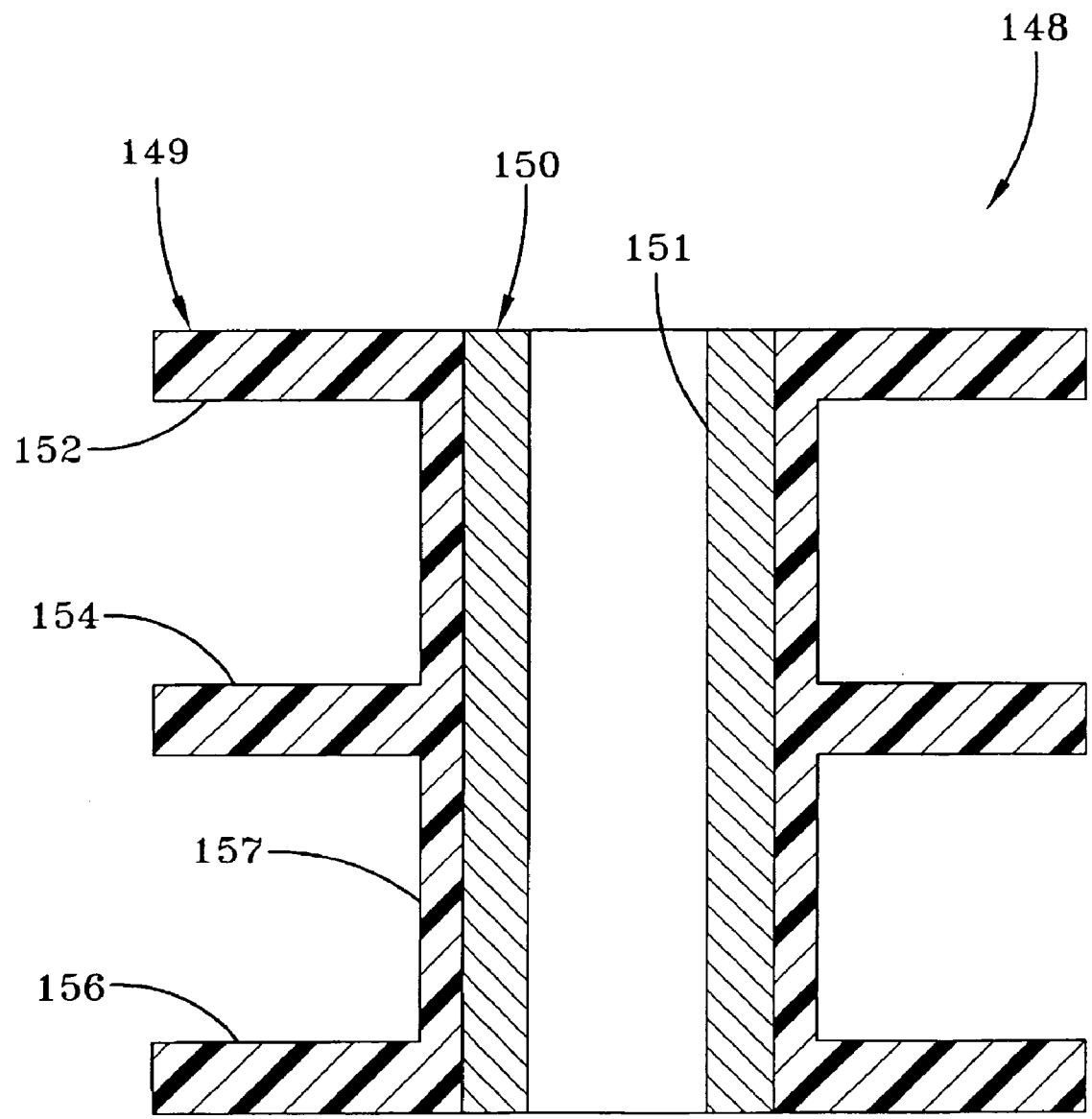
FIG. 4 is a sectional view of an alternate bobbin assembly that could be used in the system of FIG. 1.

FIG. 4 is a sectional view of an alternate bobbin assembly 148 that could be used in the system 12 of FIG. 1. The bobbin assembly 148 comprises a nickel (or other ferromagnetic material) tubular inner wall 150 defining a passageway 151 therethrough. A non-ferromagnetic bobbin 149 slides over the tubular inner wall 150 to provide the upper plate 152, divider plate 154 and lower plate 156, extending from a generally cylindrical sleeve 157. The upper plate, divider plate 154, lower plate 156 and cylindrical sleeve 157 may be integrally molded as a single piece of polymer. The bobbin assembly 148 may be used in the sensor 30 of FIG. 2 and the system 12 of FIG. 1.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A vehicle seat weight sensor comprising:
    a tubular inner wall defining a passageway for receiving a fastener therethrough;
    a fastener extending through the passageway, wherein the fastener preloads the inner wall; and
    at least one coil disposed adjacent the inner wall for measuring a stress applied to the inner wall to determine a weight on the inner wall, wherein the at least one coil includes an activation coil and a detection coil, the activation coil and the detection coil being separated by an annular divider between the activation coil and the detection coil extending radially outwardly from the tubular inner wall.

2. The vehicle seat weight sensor of claim 1 wherein the activation coil generates a signal in the inner wall.

3. The vehicle seat weight sensor of claim 2 wherein the stress applied to the inner wall alters the signal in the inner wall, and wherein the altering of the signal causes an alteration in the signal that is detected by the detection coil to determine the weight on the inner wall.

4. The vehicle seat weight sensor of claim 1 wherein the inner wall is a tubular ferromagnetic core and wherein the annular divider is formed of a polymer.

5. The vehicle seat weight sensor of claim 1 wherein the inner wall is a tubular ferromagnetic core.

6. A vehicle seat assembly comprising:
    a vehicle seat having a seating surface;
    at least one sensor mounted below the seating surface, each sensor including a tubular inner wall adjacent a coil, the tubular inner wall defining an aperture for receiving a fastener, the coil measuring stress in the tubular inner wall to determine a weight on the seating surface, wherein the at least one coil includes an activation coil and a detection coil; and
    a fastener extending through the aperture of the at least one sensor, the fastener connecting two components of the vehicle seat, wherein the fastener preloads the tubular inner wall, the activation coil and the detection coil being separated by an annular divider between the activation coil and the detection coil extending radially outwardly from the tubular inner wall.

7. The vehicle seat assembly of claim 6 wherein the activation coil generates a signal in the tubular inner wall.

8. The vehicle seat assembly of claim 7 wherein the stress applied to the tubular inner wall alters the signal in the tubular inner wall, and wherein the alteration of the signal causes an alteration in the signal that is detected by the detection coil to determine the weight on the tubular inner wall.

9. The vehicle seat assembly of claim 6 wherein the tubular inner wall is a tubular ferromagnetic core.

10. A method for installing one or more weight sensors having a coil coiled about a tubular inner wall in a vehicle seat assembly including the steps of:
    inserting a fastener at least partially through a passageway defined by the tubular inner wall of each weight sensor;
    securing a first vehicle seat component to a second vehicle seat component with each fastener; and
    securing the weight sensor between the first vehicle seat component and the second vehicle seat component with each fastener and wherein a tightening of the fasteners imparts a preload on the tubular inner walls of each sensor.

11. The method of claim 10 further including the step of securing the first vehicle seat component to the second vehicle seat component with four sensors wherein the entire weight of the first component is borne by the tubular inner walls of all four sensors.

12. The method of claim 10 wherein the coil of each weight sensor completely surrounds a fastener.

* * * * *